Sept. 8, 1931.    D. ANDERSON    1,822,259
HOSE COUPLING
Filed Jan. 21, 1931
Fig. 1.
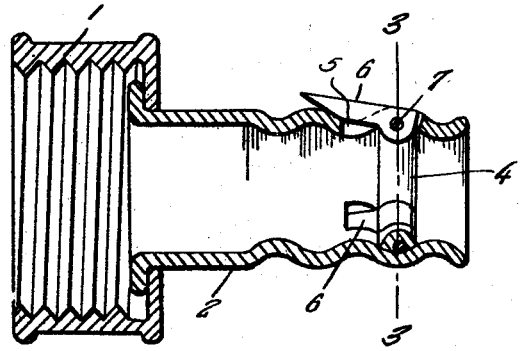
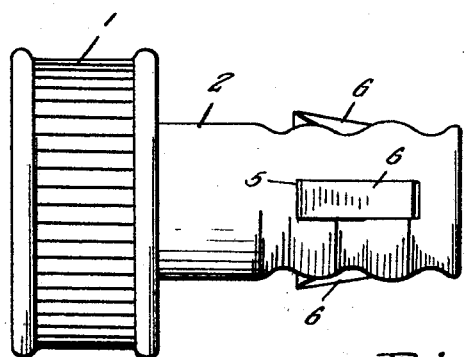
Fig. 2.
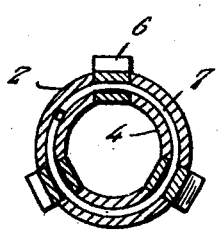
Fig. 3.
Inventor
Douglas Anderson
By Clarence A. O'Brien
Attorney Patented Sept. 8, 1931

1,822,259

UNITED STATES PATENT OFFICE

DOUGLAS ANDERSON, OF POCATELLO, IDAHO

HOSE COUPLING

Application filed January 21, 1931. Serial No. 510,308.

This invention relates to a coupling for hose, the general object of the invention being to provide means whereby when the coupling is inserted in one end of a hose it will be impossible for the coupling to be removed from the hose or to be turned in the hose so that the coupling is firmly fastened to the hose and it will be necessary to either cut the hose from the coupling or destroy the coupling in order to remove the hose. Thus this invention avoids the danger of the coupling becoming loose in the hose and causing leakage between the coupling and the end of the hose and the danger of the coupling being forced from the hose by the pressure of water.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

In the drawings:

Figure 1 is a sectional view through the improved coupling.

Figure 2 is an elevation of the coupling.

Figure 3 is a section on line 3—3 of Figure 1.

As shown in these views, the improved coupling comprises the usual internally threaded sleeve or head 1, the neck 2 on which the head or sleeve is swiveled and in carrying out my invention I form an annular rib 4, on the internal wall of the neck 2 adjacent the free end of the neck and I also form this part of the neck with a plurality of slots 5 which extend longitudinally of the neck and pass through the rib. A pointed member 6 has a part located in each slot and these members are pivotally connected with the neck by a wire 7 which passes through the rib 4 and through perforations in the members 6 so as to permit the members 6 to have rocking movement on the neck.

As shown the pointed ends of the members 6 extend toward the sleeve 1 and have beveled portions resting against portions of the outer walls of the neck so that the end of a hose can be readily forced over the neck and over the members 6. However any movement of the hose on the coupling causing the neck to move out of the hose will act to cause the points of the members 6 to partly penetrate the hose thus prevents such movement so that said members 6 lock the coupling in the hose.

The greater the force which tends to move the neck out of the hose the greater will the members 6 grip the hose as this will cause the member 6 to move outwardly and thus penetrate the hose to a greater distance.

Thus it will be seen that the member 6 firmly locks the neck of the coupling in the hose and it will be impossible for the neck to move from the hose or to turn therein so that the hose must be cut to remove it from the coupling whenever it is desired to remove the coupling from the hose.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:

A hose coupling comprising an internally threaded sleeve and a neck on which the sleeve is swiveled, said neck having elongated slots therein, an annular internal rib in the neck and through which the slots extend, a pointed member partly located in each slot and having a perforation in its outer end and a ring passing through the rib and through the perforations in the members to pivotally connect the members with the neck, the pointed ends of the members extending toward the neck.

In testimony whereof I affix my signature.

DOUGLAS ANDERSON.